(12) United States Patent
Minor et al.

(10) Patent No.: US 7,494,603 B2
(45) Date of Patent: Feb. 24, 2009

(54) AZEOTROPIC COMPOSITIONS COMPRISING FLUORINATED COMPOUNDS FOR CLEANING APPLICATIONS

(75) Inventors: Barbara Haviland Minor, Elkton, MD (US); Melodie A. Schweitzer, Wilmington, DE (US)

(73) Assignee: E. I. Du Pont de Nemours and Company, Wilmington, DE (US)

( * ) Notice: Subject to any disclaimer, the term of this patent is extended or adjusted under 35 U.S.C. 154(b) by 150 days.

(21) Appl. No.: 11/712,453

(22) Filed: Feb. 28, 2007

(65) Prior Publication Data

US 2007/0203046 A1    Aug. 30, 2007

Related U.S. Application Data

(60) Provisional application No. 60/777,350, filed on Feb. 28, 2006.

(51) Int. Cl.
  *C09K 5/04*     (2006.01)
  *C11D 7/50*     (2006.01)
  *B08B 3/08*     (2006.01)

(52) U.S. Cl. .................. 252/67; 252/68; 252/69; 510/177; 510/408; 510/415; 134/38; 134/40; 134/42

(58) Field of Classification Search .......... 252/67, 252/68, 69; 510/177, 408, 415; 134/38, 134/40, 42
See application file for complete search history.

(56) References Cited

U.S. PATENT DOCUMENTS 4,613,708 A    9/1986   Riess et al.
2007/0096051 A1 *  5/2007  Nappa et al. ............... 252/2
2007/0100010 A1 *  5/2007  Creazzo et al. ............ 521/98
2007/0100011 A1 *  5/2007  Creazzo et al. ............ 521/98
2007/0102021 A1 *  5/2007  Nappa et al. ............... 134/2
2007/0105738 A1 *  5/2007  Nappa et al. ............. 510/245
2007/0203045 A1 *  8/2007  Schweitzer et al. ...... 510/411
2007/0203046 A1 *  8/2007  Minor et al. .............. 510/411
2008/0060687 A1 *  3/2008  Schweitzer et al. ........ 134/40
2008/0191163 A1 *  8/2008  Mocella ................. 252/79.1

FOREIGN PATENT DOCUMENTS

| EP | 0 350 316 A1 | 1/1990 |
| WO | WO 2007/053178 A1 | 5/2007 |
| WO | WO 2007/053672 A2 | 5/2007 |
| WO | WO 2007/053673 A2 | 5/2007 |
| WO | WO 2008/057513 A1 * | 5/2008 |

OTHER PUBLICATIONS

CAS reg. No. 84808-65-1, Nov. 16, 1984.*
CAS reg. No. 156-60-5, Nov. 16, 1984.*
Le Blanc et al., "A Strategy for the Synthesis of Pure, Inert Perfluoroalkylated Derivatives Designed for Blood Substitution", Oxygen Carrying Colloidal Blood Substitutes, International Symposium Perfluorochem. Blood Substitutes, 1982, pp. 43-49.
Jeanneaux et al., "Additional Thermique Des Iodo-1-Perfluoroalcanes Sur Les Perfluoroalkylethylenes", Journal of Fluorine Chemistry, 4, (1974, pp. 261-270.
PCT International Search Report and Written Opinion for International Application No. PCT/US2007/005242 dated Aug. 17, 2007.

* cited by examiner

*Primary Examiner*—Douglas Mc Ginty

(57) ABSTRACT

The present invention relates to compositions comprising fluorinated olefins or fluorinated ketones, and at least one alcohol, halocarbon, hydrofluorocarbon, or fluoroether and combinations thereof. In one embodiment, these compositions are azeotropic or azeotrope-like. In another embodiment, these compositions are useful in cleaning applications as a degreasing agent or defluxing agent for removing oils and/or other residues from a surface.

14 Claims, No Drawings

AZEOTROPIC COMPOSITIONS COMPRISING FLUORINATED COMPOUNDS FOR CLEANING APPLICATIONS

CROSS REFERENCE(S) TO RELATED APPLICATION(S)

This application claims the benefit of priority of U.S. Provisional Application 60/777,350, filed Feb. 28, 2006.

BACKGROUND OF THE INVENTION

1. Field of the Invention

The present invention relates to compositions comprising fluorinated olefins, or fluorinated ketones, and at least one alcohol, halocarbon, fluoroalkyl ether, or hydrofluorocarbon and combinations thereof. These compositions are azeotropic or azeotrope-like and are useful in cleaning applications as a defluxing agent and for removing oils or residues from a surface.

2. Description of Related Art

Flux residues are always present on microelectronics components assembled using rosin flux. As modern electronic circuit boards evolve toward increased circuit and component densities, thorough board cleaning after soldering becomes a critical processing step. After soldering, the flux-residues are often removed with an organic solvent. De-fluxing solvents should be non-flammable, have low toxicity and have high solvency power, so that the flux and flux-residues can be removed without damaging the substrate being cleaned. Further, other types of residue, such as oils and greases, must be effectively removed from these devices for optimal performance in use.

Alternative, non-ozone depleting solvents have become available since the elimination of nearly all previous CFCs and HCFCs as a result of the Montreal Protocol. While boiling point, flammability and solvent power characteristics can often be adjusted by preparing solvent mixtures, these mixtures are often unsatisfactory because they fractionate to an undesirable degree during use. Such solvent mixtures also fractionate during solvent distillation, which makes it virtually impossible to recover a solvent mixture of the original composition.

Azeotropic solvent mixtures may possess the properties needed for these de-fluxing, de-greasing applications and other cleaning agent needs. Azeotropic mixtures exhibit either a maximum or a minimum boiling point and do not fractionate on boiling. The inherent invariance of composition under boiling conditions insures that the ratios of the individual components of the mixture will not change during use and that solvency properties will remain constant as well.

The present invention provides azeotropic and azeotrope-like compositions useful in semiconductor chip and circuit board cleaning, defluxing, and degreasing processes. The present compositions are non-flammable, and as they do not fractionate, will not produce flammable compositions during use. Additionally, the used azeotropic solvent mixtures may be re-distilled and re-used without composition change.

BRIEF SUMMARY OF THE INVENTION

The present invention relates to compositions comprising fluorinated olefins and, at least one compound selected from the group consisting of alcohols, halocarbons, fluoralkyl ethers, and hydrofluorocarbons and combinations thereof. In one embodiment, the at least one compound is selected from the group consisting of:
  n-propylbromide;
  trichloroethylene;
  tetrachloroethylene;
  trans-1,2-dichloroethylene;
  methanol;
  ethanol;
  n-propanol;
  isopropanol;
  $C_4F_9OCH_3$;
  $C_4F_9OC_2H_5$;
  HFC-43-10mee;
  HFC-365mfc
  and combinations thereof.

In one embodiment, the compositions are azeotropic or azeotrope-like. Additionally, the present invention relates to processes for cleaning surfaces and for removing residue from surfaces, such as integrated circuit devices.

DETAILED DESCRIPTION OF THE INVENTION

Applicants specifically incorporate by reference the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In one embodiment, the present invention relates to compositions comprising compounds having the formula E- or Z-$R^1CH=CHR^2$ (Formula I), wherein $R^1$ and $R^2$ are, independently, C1 to C5 perfluoroalkyl groups, and at least one alcohol, halocarbon, fluoroalkyl ethers, or hydrofluorocarbon and combinations thereof. Examples of $R^1$ and $R^2$ groups include, but are not limited to, $CF_3$, $C_2F_5$, n-$C_3F_7$, i-$C_3F_7$, n-$C_4F_9$, n-$C_5F_{11}$, and i-$C_4F_9$. Exemplary, non-limiting Formula I compounds are presented in Table 1.

TABLE 1

| Code | Structure | IUPAC Name |
| --- | --- | --- |
| F11E | $CF_3CH=CHCF_3$ | 1,1,1,4,4,4-hexafluoro-2-butene |
| F12E | $CF_3CH=CHC_2F_5$ | 1,1,1,4,4,5,5,5-octafluoro-2-pentene |
| F13E | $CF_3CH=CH(n-C_3F_7)$ | 1,1,1,4,4,5,5,6,6,6-decafluoro-2-hexene |
| F13iE | $CF_3CH=CH(i-C_3F_7)$ | 1,1,1,4,4,5,5,5-heptafluoro-4-(trifluoromethyl)-2-pentene |
| F22E | $C_2F_5CH=CHC_2F_5$ | 1,1,1,2,2,5,5,6,6,6-decafluoro-3-hexene |
| F14E | $CF_3CH=CH(n-C_4F_9)$ | 1,1,1,4,4,5,5,6,6,7,7,7-dodecafluorohept-2-ene |
| F23E | $C_2F_5CH=CH(n-C_3F_7)$ | 1,1,1,2,2,5,5,6,6,7,7,7-dodecafluorohept-3-ene |

TABLE 1-continued

| Code | Structure | IUPAC Name |
| --- | --- | --- |
| F23iE | $C_2F_5CH=CH(i-C_3F_7)$ | 1,1,1,2,2,5,6,6,6-nonafluoro-5-(trifluoromethyl)hex-3-ene |
| F15E | $CF_3CH=CH(n-C_5F_{11})$ | 1,1,1,4,4,5,5,6,6,7,7,8,8,8-tetraddecafluorooct-2-ene |
| F24E | $C_2F_5CH=CH(n-C_4F_9)$ | 1,1,1,2,2,5,5,6,6,7,7,8,8,8-tetradecafluorooct-3-ene |
| F3i3iE | $i-C_3F_7CH=CH(i-C_3F_7)$ | 1,1,1,2,5,6,6,6-octafluoro-2,5-bis(trimethylfluoro)hex-3-ene |
| F33iE | $n-C_3F_7CH=CH(i-C_3F_7)$ | 1,1,1,2,5,5,6,6,7,7,7-undecafluoro-2(trifluoromethyl)hept-3-ene |
| F34E | $n-C_3F_7CH=CH(n-C_4F_9)$ | 1,1,1,2,2,3,3,6,6,7,7,8,8,9,9,9-hexadecafluoronon-4-ene |
| F3i4E | $i-C_3F_7CH=CH(n-C_4F_9)$ | 1,1,1,2,5,5,6,6,7,7,8,8,8-triskaidecafluoro-2(trifluoromethyl)oct-3-ene |
| F44E | $n-C_4F_9CH=CH(n-C_4F_9)$ | 1,1,1,2,2,3,3,4,4,7,7,8,8,9,9,10,10,10-octadecafluorodec-5-ene |

Compounds of Formula I may be prepared by contacting a perfluoroalkyl iodide of the formula $R^1I$ with a perfluoroalkyltrihydroolefin of the formula $R^2CH=CH_2$ to form a trihydroiodoperfluoroalkane of the formula $R^1CH_2CHIR^2$. This trihydroiodoperfluoroalkane can then be dehydroiodinated to form $R^1CH=CHR^2$. Alternatively, the olefin $R^1CH=CHR^2$ may be prepared by dehydroiodination of a trihydroiodoperfluoroalkane of the formula $R^1CHICH_2R^2$ formed in turn by reacting a perfluoroalkyl iodide of the formula $R^2I$ with a perfluoroalkyltrihydroolefin of the formula $R^1CH=CH_2$.

Said contacting of a perfluoroalkyl iodide with a perfluoroalkyltrihydroolefin may take place in batch mode by combining the reactants in a suitable reaction vessel capable of operating under the autogenous pressure of the reactants and products at reaction temperature. Suitable reaction vessels include those fabricated from stainless steels, in particular of the austenitic type, and the well-known high nickel alloys such as Monel® nickel-copper alloys, Hastelloy® nickel based alloys and Inconel® nickel-chromium alloys. Alternatively, the reaction may take be conducted in semi-batch mode in which the perfluoroalkyltrihydroolefin reactant is added to the perfluoroalkyl iodide reactant by means of a suitable addition apparatus such as a pump at the reaction temperature.

The ratio of perfluoroalkyl iodide to perfluoroalkyltrihydroolefin should be between about 1:1 to about 4:1, preferably from about 1.5:1 to 2.5:1. Ratios less than 1.5:1 tend to result in large amounts of the 2:1 adduct as reported by Jeanneaux, et. al . in Journal of Fluorine Chemistry, Vol. 4, pages 261-270 (1974).

Temperatures for contacting of said perfluoroalkyl iodide with said perfluoroalkyltrihydroolefin are preferably within the range of about 150° C. to 300° C., more preferably from about 170° C. to about 250° C., and most preferably from about 180° C. to about 230° C. Pressures for contacting of said perfluoroalkyl iodide with said perfluoroalkyltrihydroolefin are preferably the autogenous pressure of the reactants at the reaction temperature.

Suitable contact times for the reaction of the perfluoroalkyl iodide with the perfluoroalkyltrihydroolefin are from about 0.5 hour to 18 hours, preferably from about 4 to about 12 hours.

The trihydroiodoperfluoroalkane prepared by reaction of the perfluoroalkyl iodide with the perfluoroalkyltrihydroolefin may be used directly in the dehydroiodination step or may preferably be recovered and purified by distillation prior to the dehydroiodination step.

In yet another embodiment, the contacting of a perfluoroalkyliodide with a perfluoroalkyltrihydroolefin takes place in the presence of a catalyst. In one embodiment, a suitable catalyst is a Group VIII transition metal complex. Representative Group VIII transition metal complexes include, without limitation, zero valent $NiL_4$ complexes, wherein the ligand, L, can be a phosphine ligand, a phosphite ligand, a carbonyl ligand, an isonitrile ligand, an alkene ligand, or a combination thereof. In one such embodiment, the $Ni(0)L_4$ complex is a $NiL_2(CO)_2$ complex. In one particular embodiment, the Group VIII transition metal complex is bis(triphenyl phosphine)nickel(0) dicarbonyl. In one embodiment, the ratio of perfluoroalkyl iodide to perfluoroalkyltrihydroolefin is between about 3:1 to about 8:1. In one embodiment, the temperature for contacting of said perfluoroalkyl iodide with said perfluoroalkyltrihydroolefin in the presence of a catalyst, is within the range of about 80° C. to about 130° C. In another embodiment, the temperature is from about 90° C. to about 120° C.

In one embodiment, the contact time for the reaction of the perfluoroalkyl iodide with the perfluoroalkyltrihydroolefin in the presence of a catalyst is from about 0.5 hour to about 18 hours. In another embodiment, the contact time is from about 4 to about 12 hours.

The dehydroiodination step is carried out by contacting the trihydroiodoperfluoroalkane with a basic substance. Suitable basic substances include alkali metal hydroxides (e.g., sodium hydroxide or potassium hydroxide), alkali metal oxide (for example, sodium oxide), alkaline earth metal hydroxides (e.g., calcium hydroxide), alkaline earth metal oxides (e.g., calcium oxide), alkali metal alkoxides (e.g., sodium methoxide or sodium ethoxide), aqueous ammonia, sodium amide, or mixtures of basic substances such as soda lime. Preferred basic substances are sodium hydroxide and potassium hydroxide.

Said contacting of the trihydroiodoperfluoroalkane with a basic substance may take place in the liquid phase preferably in the presence of a solvent capable of dissolving at least a portion of both reactants. Solvents suitable for the dehydroiodination step include one or more polar organic solvents such as alcohols (e.g., methanol, ethanol, n-propanol, isopropanol, n-butanol, isobutanol, and tertiary butanol), nitriles (e.g., acetonitrile, propionitrile, butyronitrile, benzonitrile, or adiponitrile), dimethyl sulfoxide, N,N-dimethylformamide, N,N-dimethylacetamide, or sulfolane. The choice of solvent depends on the solubility of the basic substance, the solubility of the perfluoroalkyl iodide, and the solubility of the perfluoroalkyltrihydroolefin as well as the boiling point of the product, and the ease of separation of traces of the solvent from the product during purification. Typically, ethanol or isopropanol are good solvents for the reaction. Separation of solvent from the product may be effected by distillation, extraction, phase separation, or a combination of the three.

Typically, the dehydroiodination reaction may be carried out by addition of one of the reactants (either the basic substance or the trihydroiodoperfluoroalkane) to the other reactant in a suitable reaction vessel. Said reaction vessel may be fabricated from glass, ceramic, or metal and is preferably agitated with an impellor or other stirring mechanism.

Temperatures suitable for the dehydroiodination reaction are from about 10° C. to about 100° C., preferably from about 20° C. to about 70° C. The dehydroiodination reaction may be carried out at ambient pressure or at reduced or elevated pressure. Of note are dehydroiodination reactions in which the compound of Formula I is distilled out of the reaction vessel as it is formed.

Alternatively, the dehydroiodination reaction may be conducted by contacting an aqueous solution of said basic substance with a solution of the trihydroiodoperfluoroalkane in one or more organic solvents of lower polarity such as an alkane (e.g., hexane, heptane, or octane), aromatic hydrocarbon (e.g., toluene), halogenated hydrocarbon (e.g., methylene chloride, ethylene dichloride, chloroform, carbon tetrachloride, or perchloroethylene), or ether (e.g., diethyl ether, methyl tert-butyl ether, tetrahydrofuran, 2-methyl tetrahydrofuran, dioxane, dimethoxyethane, diglyme, or tetraglyme) in the presence of a phase transfer catalyst. Suitable phase transfer catalysts include quaternary ammonium halides (e.g., tetrabutylammonium bromide, tetrabutylammonium hydrosulfate, triethylbenzylammonium chloride, dodecyltrimethylammonium chloride, and tricaprylylmethylammonium chloride), quaternary phosphonium halides (e.g., triphenylmethylphosphonium bromide and tetraphenylphosphonium chloride), cyclic ether compounds known in the art as crown ethers (e.g., 18-crown-6 and 15-crown-5).

Alternatively, the dehydroiodination reaction may be conducted in the absence of solvent by adding the trihydroiodoperfluoroalkane to one or more solid or liquid basic substance(s).

Suitable reaction times for the dehydroiodination reactions are from about 15 minutes to about six hours or more depending on the solubility of the reactants. Typically the dehydroiodination reaction is rapid and requires about 30 minutes to about three hours for completion.

The compound of formula I may be recovered from the dehydroiodination reaction mixture by phase separation, optionally after addition of water, by distillation, or by a combination thereof.

In another embodiment, the invention relates to compositions comprising perfluoroethyl isopropyl ketone (1,1,1,2,2,4,5,5,5-nonafluoro-4-(trifluoromethyl)-3-pentanone, (PEIK) and at least two compounds selected from the group consisting of alcohols, halocarbons, fluoralkyl ethers, and hydrofluorocarbons. PEIK has CAS Reg. No. 756-13-8) and is available from 3M™ (St. Paul, Minn.).

In yet another embodiment, the invention relates to compositions comprising nonafluoro-1-hexene (3,3,4,4,5,5,6,6,6-nonafluoro-1-hexene), (PFBE), and at least one compound selected from the group consisting of alcohols, halocarbons, fluoralkyl ethers, and hydrofluorocarbons and combinations thereof. 3,3,4,4,5,5,6,6,6-Nonafluoro-1-hexene, also known as HFC-1549fz, has CAS Registry Number 19430-93-4 and is available from E.I. DuPont de Nemours & Co (Wilmington, Del.).

In yet another embodiment, the invention relates to a process for cleaning surfaces using azeotropic or azeotrope-like compositions comprising a fluorinated olefin, or a fluorinated ketone and at least least one compound selected from the group consisting of alcohols, halocarbons, fluoralkyl ethers, and hydrofluorocarbons.

The fluorolefins of Table 1, PEIK, and PFBE may be combined with the compounds listed in Table 2 to form the present inventive compositions. The at least one compound selected from the group consisting of alcohols, halocarbons, fluoroalkyl ethers, or hydrofluorocarbons to be combined with PFBE shall not be an alcohol, trans-1,2-dichloroethylene alone, $C_4F_9OCH_3$ alone, HFC43-10mee alone, HFC-365mfc alone, or a mixture of trans-1,2-dichloroethylene and $C_4F_9OC_2H_5$.

TABLE 2

| Name | Chemical formula | Synonym (or abbreviation) | CAS registry number |
|---|---|---|---|
| Halocarbons | | | |
| trichloroethylene | $CHCl=CCl_2$ | TCE | 79-01-6 |
| tetrachloroethylene (or perchloroethylene) | $CCl_2=CCl_2$ | PCE | 127-18-4 |
| n-propylbromide | $CH_3CH_2CH_2Br$ | nPBr | |
| trans-1,2-dichloroethylene | $CHCl=CHCl$ | t-DCE | 156-60-5 |
| Alcohols | | | |
| methanol | $CH_3OH$ | MeOH | 67-56-1 |
| ethanol | $CH_3CH_2OH$ | EtOH | 64-17-5 |
| n-propanol | $CH_3CH_2CH_2OH$ | n-PrOH | 71-23-8 |
| isopropanol | $CH_3CH(OH)CH_3$ | IPA | 67-63-0 |
| Fluoroethers | | | |
| mixture of isomers - 1,1,1,2,2,3,3,4,4-nonafluoro-4-methoxybutane and 2-(methoxydifluoromethyl)-1,1,1,2,3,3,3-heptafluoropropane | $CF_3CF_2CF_2CF_2OCH_3$ and $(CF_3)_2CFCF_2OCH_3$ | $C_4F_9OCH_3$ | 163702-07-6 and 163702-08-7 |
| mixture of isomers - 1-ethoxy-1,1,2,2,3,3,4,4,4-nonafluorobutane and 2-(ethoxydifluoromethyl)-1,1,1,2,3,3,3-heptafluoropropane | $CF_3CF_2CF_2CF_2OC_2H_5$ and $(CF_3)_2CFCF_2OC_2H_5$ | $C_4F_9OC_2H_5$ | 163702-05-4 and 163702-06-5 |

TABLE 2-continued

| Name | Chemical formula | Synonym (or abbreviation) | CAS registry number |
|---|---|---|---|
| Hydrofluorocarbons | | | |
| 1,1,1,2,3,4,4,5,5,5-decafluoropentane | $CF_3CHFCHFCF_2CF_3$ | HFC-43-10mee | |
| 1,1,1,3,3-pentafluorobutane | $CF_3CH_2CF_2CH_3$ | HFC-365mfc | |

The compounds listed in Table 2 are commercially available from chemical supply houses. $C_4F_9OCH_3$, and $C_4F_9OC_2H_5$ are available from 3M™ (St. Paul, Minn.). HFC-43-10mee is available from E.I. DuPont de Nemours & Co (Wilmington, Del.). HFC-365mfc is available from Solvay-Solexis.

The compositions of the present invention may be prepared by any convenient method by combining the desired amounts of the individual components. A preferred method is to weigh the desired component amounts and thereafter combining the components in an appropriate vessel. Agitation may be used, if desired.

The compositions of the present invention comprise compositions containing one of the fluoroolefins listed in Table 1, PEIK, or PFBE, and at least one of the compounds selected from the group consisting of: trichloroethylene; tetrachloroethylene; trans-1,2-dichloroethylene; n-propylbromide; methanol; ethanol; n-propanol; isopropanol; $C_4F_9OCH_3$; $C_4F_9OC_2H_5$; HFC-43-10mee; HFC-365mfc; and combinations thereof. In one embodiment, the compositions are azeotropic or azeotrope-like. The exception thereto being that according to the compositions of the present invention, PFBE is not combined with an alcohol, trans-1,2-dichloroethylene alone, $C_4F_9OCH_3$ alone, HFC-43-10mee alone, HFC-365mfc alone, or a mixture of trans-1,2-dichloroethylene or $C_4F_9OC_2H_5$.

As used herein, an azeotropic composition is a constant boiling liquid admixture of two or more substances wherein the admixture distills without substantial composition change and behaves as a constant boiling composition. Constant boiling compositions, which are characterized as azeotropic, exhibit either a maximum or a minimum boiling point, as compared with that of the non-azeotropic mixtures of the same substances. Azeotropic compositions as used herein include homogeneous azeotropes which are liquid admixtures of two or more substances that behave as a single substance, in that the vapor, produced by partial evaporation or distillation of the liquid, has the same composition as the liquid. Azeotropic compositions as used herein also include heterogeneous azeotropes where the liquid phase splits into two or more liquid phases. In these embodiments, at the azeotropic point, the vapor phase is in equilibrium with two liquid phases and all three phases have different compositions. If the two equilibrium liquid phases of a heterogeneous azeotrope are combined and the composition of the overall liquid phase calculated, this would be identical to the composition of the vapor phase.

As used herein, the term "azeotrope-like composition" also sometimes referred to as "near azeotropic composition," means a constant boiling, or substantially constant boiling liquid admixture of two or more substances that behaves as a single substance. One way to characterize an azeotrope-like composition is that the vapor produced by partial evaporation or distillation of the liquid has substantially the same composition as the liquid from which it was evaporated or distilled. That is, the admixture distills/refluxes without substantial composition change. Another way to characterize an azeotrope-like composition is that the bubble point vapor pressure of the composition and the dew point vapor pressure of the composition at a particular temperature are substantially the same. Herein, a composition is azeotrope-like if, after 50 weight percent of the composition is removed such as by evaporation or boiling off, the difference in vapor pressure between the original composition and the composition remaining after 50 weight percent of the original composition has been removed by evaporation or boil off is less than 10 percent.

In cleaning apparati, such as vapor degreasers or defluxers, some loss of the cleaning compositions may occur during operation through leaks in shaft seals, hose connections, soldered joints and broken lines. In addition, the working composition may be released to the atmosphere during maintenance procedures on equipment. If the composition is not a pure compound or azeotropic or azeotrope-like composition, the composition may change when leaked or discharged to the atmosphere from the equipment, which may cause the composition remaining in the equipment to become flammable or to exhibit unacceptable performance. Accordingly, it is desirable to use as a cleaning composition a single fluorinated hydrocarbon or an azeotropic or azeotrope-like composition that fractionates to a negligible degree upon leak or boil-off.

The azeotropic compositions of one embodiment of the present invention are listed in Table 3.

TABLE 3

| Comp A | Comp B | wt % A | wt % B | T(C.) |
|---|---|---|---|---|
| F14E | methanol | 85.1 | 14.9 | 59.1 |
| F14E | isopropanol | 87.1 | 12.9 | 66.9 |
| F14E | ethanol | 87.9 | 12.1 | 65.2 |
| F14E | t-DCE | 44.3 | 55.7 | 44.0 |
| F14E | nPBr | 54.4 | 45.6 | 66.6 |
| F24E | methanol | 72.1 | 27.9 | 63.4 |
| F24E | isopropanol | 78.1 | 21.9 | 74.1 |
| F24E | ethanol | 79.2 | 20.8 | 71.8 |
| F24E | t-DCE | 24.5 | 75.5 | 45 |
| F24E | nPBr | 25.7 | 74.3 | 70.2 |
| F24E | PCE | 85.2 | 14.8 | 89.9 |
| F24E | TCE | 65.0 | 35.0 | 75.9 |
| PEIK | methanol | 97.0 | 3.0 | 43.5 |
| PEIK | isopropanol | 96.7 | 3.3 | 45.5 |
| PEIK | ethanol | 96.8 | 3.2 | 44.7 |
| PEIK | t-DCE | 72.9 | 27.1 | 34.7 |
| PEIK | 43-10mee | 73.2 | 26.8 | 47.7 |
| PEIK | 365mfc | 38.8 | 61.2 | 38.1 |
| PFBE | methanol | 92.2 | 7.8 | 50.6 |
| PFBE | isopropanol | 95.2 | 4.8 | 56.3 |
| PFBE | ethanol | 94.8 | 5.2 | 55.2 |
| PFBE | t-DCE | 52.8 | 47.2 | 41.3 |
| PFBE | nPBr | 82.3 | 17.7 | 57.1 |
| F22E | methanol | 95.8 | 4.2 | 43.7 |
| F22E | isopropanol | 98.0 | 2.0 | 47.2 |

TABLE 3-continued

| Comp A | Comp B | wt % A | wt % B | T(C.) |
|---|---|---|---|---|
| F22E | ethanol | 97.6 | 2.4 | 46.6 |
| F22E | t-DCE | 71.0 | 29.0 | 33.9 |
| F22E | nPBr | 87.0 | 13.0 | 43.3 |
| F22E | 43-10mee | 89.8 | 10.2 | 47.9 |
| F22E | 365mfc | 29.3 | 70.7 | 39.2 |
| F13iE | methanol | 95.5 | 4.5 | 44.4 |
| F13iE | isopropanol | 97.8 | 2.2 | 48.0 |
| F13iE | ethanol | 97.4 | 2.6 | 47.5 |
| F13iE | t-DCE | 70.2 | 29.8 | 34.4 |
| F13iE | nPBr | 86.4 | 13.6 | 44.0 |
| F13iE | 43-10mee | 95.3 | 4.7 | 48.8 |
| F13iE | 365mfc | 24.6 | 75.4 | 39.5 |
| F3i3iE | methanol | 85.0 | 15.0 | 59.8 |
| F3i3iE | isopropanol | 89.2 | 10.8 | 70.0 |
| F3i3iE | ethanol | 89.0 | 11.0 | 67.8 |
| F3i3iE | t-DCE | 44.1 | 55.9 | 44.5 |
| F3i3iE | $C_4F_9OC_2H_5$ | 22.8 | 77.2 | 75.7 |
| F3i3iE | nPBr | 67.4 | 32.6 | 61.3 |
| F13E | methanol | 94.4 | 5.6 | 47.3 |
| F13E | isopropanol | 96.9 | 3.1 | 51.9 |
| F13E | ethanol | 96.5 | 3.5 | 51.1 |
| F13E | t-DCE | 66.3 | 33.7 | 36.3 |
| F13E | nPBr | 83.7 | 16.3 | 47.1 |
| F13E | 43-10mee | 59.5 | 40.5 | 52.3 |
| F3i4E | t-DCE | 7.6 | 92.4 | 47.6 |
| F3i4E | methanol | 42.8 | 57.2 | 65.4 |
| F3i4E | isopropanol | 57.8 | 42.2 | 81.0 |
| F3i4E | ethanol | 58.7 | 41.3 | 77.3 |
| F3i4E | nPBr | 31.9 | 68.1 | 69.6 |
| F44E | nPBr | 8.1 | 91.9 | 70.9 |

Additionally in another embodiment, the azeotropic compositions of the present invention may include ternary and quarternary azeotropic compositions comprising compounds from Table 2. Examples without limitation of these higher order azeotropic compositions are exemplified in Table 4 along with the atmospheric pressure boiling points for the compositions.

TABLE 4

| Comp A | Comp B | Comp C | wt % A | wt % B | wt % C | T(C.) |
|---|---|---|---|---|---|---|
| F14E | t-DCE | methanol | 34.4 | 59.0 | 6.6 | 39.9 |
| F14E | t-DCE | ethanol | 41.9 | 55.1 | 3.0 | 43.2 |
| F24E | t-DCE | methanol | 10.3 | 80.3 | 9.4 | 41.0 |
| F24E | t-DCE | ethanol | 24.8 | 70.9 | 4.3 | 43.0 |
| PEIK | t-DCE | methanol | 71.5 | 26.4 | 2.1 | 33.0 |
| PEIK | t-DCE | ethanol | 73.0 | 25.7 | 1.3 | 34.2 |
| PEIK | t-DCE | 43-10mee | 57.0 | 26.9 | 16.1 | 34.3 |
| PEIK | t-DCE | 365mfc | 43.7 | 24.1 | 32.2 | 32.6 |
| PFBE | t-DCE | $C_4F_9OCH_3$ | 40.1 | 47.5 | 12.4 | 41.3 |
| F22E | t-DCE | methanol | 67.9 | 29.7 | 2.4 | 32.6 |
| F22E | t-DCE | 365mfc | 45.4 | 27.2 | 27.4 | 33.0 |
| F13iE | t-DCE | methanol | 66.9 | 30.6 | 2.5 | 33.0 |
| F13iE | t-DCE | 43-10mee | 69.8 | 29.8 | 0.4 | 34.4 |
| F13iE | t-DCE | 365mfc | 41.9 | 27.8 | 30.3 | 33.3 |
| F3i3iE | t-DCE | methanol | 32.9 | 60.2 | 6.9 | 40.1 |
| F3i3iE | t-DCE | ethanol | 41.1 | 56.3 | 2.6 | 43.8 |
| F13E | t-DCE | methanol | 62.2 | 34.7 | 3.1 | 34.5 |
| F13E | t-DCE | 43-10mee | 48.0 | 33.2 | 18.8 | 36.1 |
| F13E | t-DCE | 365mfc | 23.1 | 30.3 | 46.6 | 34.4 |

The binary azeotrope-like compositions of the present invention are listed in Table 5.

TABLE 5

| Comp A | Comp B | wt % A | wt % B | T(C.) |
|---|---|---|---|---|
| F14E | Methanol | 60-99 | 1-40 | 59.1 |
| F14E | Isopropanol | 70-99 | 1-30 | 66.9 |
| F14E | Ethanol | 72-99 | 1-28 | 65.2 |
| F14E | t-DCE | 1-75 | 25-99 | 44.0 |
| F14E | nPBr | 1-99 | 1-99 | 66.6 |
| F14E | $C_4F_9OCH_3$ | 1-99 | 1-99 | 50 |
| F14E | $C_4F_9OC_2H_5$ | 1-99 | 1-99 | 50 |
| F14E | 43-10mee | 1-99 | 1-99 | 50 |
| F24E | Methanol | 1-91 | 9-99 | 63.4 |
| F24E | Isopropanol | 57-91 | 9-43 | 74.1 |
| F24E | Ethanol | 57-92 | 8-43 | 71.8 |
| F24E | t-DCE | 1-63 | 37-99 | 46.1 |
| F24E | nPBr | 1-70 | 30-99 | 70.2 |
| F24E | PCE | 61-99 | 1-39 | 89.9 |
| F24E | TCE | 40-84 | 16-60 | 75.9 |
| F24E | $C_4F_9OC_2H_5$ | 1-99 | 1-99 | 50 |
| PEIK | Methanol | 91-99 | 1-9 | 43.5 |
| PEIK | Isopropanol | 57-99 | 1-16 | 45.5 |
| PEIK | Ethanol | 85-99 | 1-15 | 44.7 |
| PEIK | t-DCE | 50-88 | 12-50 | 34.7 |
| PEIK | 4310mcee | 1-99 | 1-99 | 47.7 |
| PEIK | 365mfc | 1-99 | 1-99 | 38.1 |
| PEIK | $C_4F_9OCH_3$ | 1-99 | 1-99 | 50 |
| PFBE | Methanol | 80-99 | 1-20 | 50.6 |
| PFBE | Isopropanol | 83-99 | 1-17 | 56.3 |
| PFBE | Ethanol | 83-99 | 1-17 | 55.2 |
| PFBE | t-DCE | 21-79 | 21-79 | 41.3 |
| PFBE | nPBr | 44-99 | 1-55 | 57.1 |
| PFBE | $C_4F_9OCH_3$ | 1-99 | 1-99 | 50 |
| PFBE | $C_4F_9OC_2H_5$ | 1-99 | 1-99 | 50 |
| PFBE | 43-10mee | 1-99 | 1-99 | 50 |
| PFBE | 365mfc | 1-99 | 1-99 | 50 |
| F22E | Methanol | 86-99 | 1-14 | 43.7 |
| F22E | Isopropanol | 88-99 | 1-12 | 47.2 |
| F22E | Ethanol | 88-99 | 1-12 | 46.6 |
| F22E | t-DCE | 48-87 | 13-52 | 33.9 |
| F22E | nPBr | 64-99 | 1-36 | 43.3 |
| F22E | 43-10mee | 1-99 | 1-99 | 47.9 |
| F22E | 365mfc | 1-99 | 1-99 | 39.2 |
| F22E | $C_4F_9OCH_3$ | 1-99 | 1-99 | 50 |
| F13iE | Methanol | 86-99 | 1-14 | 44.4 |
| F13iE | Isopropanol | 87-99 | 1-13 | 48.0 |
| F13iE | Ethanol | 88-99 | 1-12 | 47.5 |
| F13iE | t-DCE | 46-86 | 14-54 | 34.4 |
| F13iE | nPBr | 64-99 | 1-36 | 44.0 |
| F13iE | 43-10mee | 1-99 | 1-99 | 48.8 |
| F13iE | 365mfc | 1-99 | 1-99 | 39.5 |
| F13iE | $C_4F_9OCH_3$ | 1-99 | 1-99 | 50 |
| F3i3iE | Methanol | 57-99 | 1-43 | 59.8 |
| F3i3iE | Isopropanol | 73-99 | 1-27 | 70.0 |
| F3i3iE | Ethanol | 73-99 | 1-27 | 67.8 |
| F3i3iE | t-DCE | 1-76 | 24-99 | 44.5 |
| F3i3iE | $C_4F_9OC_2H_5$ | 1-99 | 1-99 | 75.7 |
| F3i3iE | nPBr | 43-86 | 14-57 | 61.3 |
| F3i3iE | $C_4F_9OCH_3$ | 1-99 | 1-99 | 50 |
| F13E | Methanol | 84-99 | 1-16 | 47.3 |
| F13E | Isopropanol | 86-99 | 1-14 | 51.9 |
| F13E | Ethanol | 86-99 | 1-14 | 51.1 |
| F13E | t-DCE | 42-84 | 16-58 | 36.3 |
| F13E | nPBr | 61-99 | 1-39 | 47.1 |
| F13E | 43-10mee | 1-99 | 1-99 | 52.3 |
| F13E | $C_4F_9OCH_3$ | 1-99 | 1-99 | 50 |
| F13E | $C_4F_9OC_2H_5$ | 1-99 | 1-99 | 50 |
| F13E | 365mfc | 1-99 | 1-99 | 50 |
| F3i4E | t-DCE | 1-69 | 31-99 | 47.6 |
| F3i4E | Methanol | 1-89 | 11-99 | 65.4 |
| F3i4E | Isopropanol | 1-88 | 12-99 | 81 |
| F3i4E | Ethanol | 1-89 | 11-99 | 77.3 |
| F3i4E | nPBr | 1-72 | 28-99 | 69.6 |
| F44E | nPBr | 1-70 | 30-99 | 70.9 |

In addition to the binary azeotrope-like compositions in the preceding table, higher order (ternary or quarternary) azeotrope-like compositions are included in the present invention. Examples without limitation of ternary or higher order azeotrope-like compositions are given in Table 6.

TABLE 6

| Comp A | Comp B | Comp C | wt % A | wt % B | wt % C | T(C.) |
|---|---|---|---|---|---|---|
| F14E | t-DCE | C$_4$F$_9$OCH$_3$ | 1-70 | 20-70 | 1-70 | 50 |
| F14E | t-DCE | C$_4$F$_9$OC$_2$H$_5$ | 1-70 | 29-90 | 1-60 | 50 |
| F14E | t-DCE | 43-10mee | 1-80 | 15-60 | 1-80 | 50 |
| F14E | t-DCE | 365mfc | 1-70 | 10-60 | 1-80 | 50 |
| F14E | t-DCE | Methanol | 1-70 | 29-98 | 1-30 | 39.9 |
| F14E | t-DCE | ethanol | 1-70 | 29-98 | 1-20 | 43.2 |
| F24E | t-DCE | C$_4$F$_9$OCH$_3$ | 1-70 | 20-70 | 1-70 | 50 |
| F24E | t-DCE | C$_4$F$_9$OC$_2$H$_5$ | 1-60 | 30-80 | 1-60 | 50 |
| F24E | t-DCE | Methanol | 1-50 | 40-98 | 1-25 | 41.0 |
| F24E | t-DCE | ethanol | 1-60 | 39-98 | 1-20 | 45.0 |
| PEIK | t-DCE | C$_4$F$_9$OCH$_3$ | 1-70 | 20-50 | 1-70 | 50 |
| PEIK | t-DCE | Methanol | 50-85 | 14-49 | 1-9 | 33.0 |
| PEIK | t-DCE | ethanol | 50-85 | 14-49 | 1-9 | 34.2 |
| PEIK | t-DCE | 43-10mee | 1-85 | 10-65 | 1-80 | 34.3 |
| PEIK | t-DCE | 365mfc | 1-85 | 1-55 | 1-85 | 32.6 |
| PFBE | t-DCE | 43-10mee | 1-70 | 20-60 | 1-79 | 50 |
| PFBE | t-DCE | 365mfc | 1-70 | 15-60 | 1-80 | 50 |
| PFBE | t-DCE | C$_4$F$_9$OCH$_3$ | 1-75 | 24-75 | 1-70 | 41.3 |
| F22E | t-DCE | C$_4$F$_9$OCH$_3$ | 1-70 | 29-70 | 1-70 | 50 |
| F22E | t-DCE | 43-10mee | 1-80 | 19-60 | 1-80 | 50 |
| F22E | t-DCE | Methanol | 45-85 | 14-54 | 1-10 | 32.6 |
| F22E | t-DCE | 365mfc | 1-89 | 10-60 | 1-85 | 33.0 |
| F13iE | t-DCE | C$_4$F$_9$OCH$_3$ | 1-75 | 24-70 | 1-70 | 50 |
| F13iE | t-DCE | Methanol | 45-85 | 14-54 | 1-10 | 33.0 |
| F13iE | t-DCE | 43-10mee | 1-89 | 10-60 | 1-80 | 34.4 |
| F13iE | t-DCE | 365mfc | 1-89 | 10-60 | 1-84 | 33.3 |
| F3i3iE | t-DCE | Methanol | 1-70 | 29-95 | 1-25 | 40.1 |
| F3i3iE | t-DCE | ethanol | 1-65 | 34-98 | 1-15 | 43.8 |
| F3i3iE | t-DCE | C$_4$F$_9$OCH$_3$ | 1-69 | 30-70 | 1-69 | 50 |
| F3i3iE | t-DCE | C$_4$F$_9$OC$_2$H$_5$ | 1-69 | 30-80 | 1-69 | 50 |
| F13E | t-DCE | Methanol | 45-80 | 19-54 | 1-10 | 34.5 |
| F13E | t-DCE | 43-10mee | 1-85 | 14-60 | 1-80 | 36.1 |
| F13E | t-DCE | 365mfc | 1-85 | 14-60 | 1-80 | 34.4 |
| F13E | t-DCE | C$_4$F$_9$OCH$_3$ | 1-80 | 19-70 | 1-70 | 50 |
| F3i4E | t-DCE | C$_4$F$_9$OCH$_3$ | 1-30 | 25-69 | 30-69 | 50 |
| F3i4E | t-DCE | C$_4$F$_9$OC$_2$H$_5$ | 1-50 | 30-98 | 1-60 | 50 |
| F44E | t-DCE | C$_4$F$_9$OC$_2$H$_5$ | 1-70 | 1-60 | 29-98 | 50 |

In yet another embodiment of the invention, the compositions of the present invention may further comprise an aerosol propellant. Aerosol propellants may assist in delivering the present compositions from a storage container to a surface in the form of an aerosol. Aerosol propellant is optionally included in the present compositions in up to 25 weight percent of the total composition. Representative aerosol propellants comprise air, nitrogen, carbon dioxide, difluoromethane (HFC-32, $CH_2F_2$), trifluoromethane (HFC-23, $CHF_3$), difluoroethane (HFC-152a, $CHF_2CH_3$), trifluoroethane (HFC-143a, $CH_3CF_3$; or HFC-143, $CHF_2CH_2F$), tetrafluoroethane (HFC-134a, $CF_3CH_2F$; HFC-134, $CHF_2CHF_2$), pentafluoroethane (HFC-125, $CF_3CHF_2$), heptafluoropropane (HFC-227ea, $CF_3CHFCF_3$), pentafluoropropane (HFC-245fa, $CF_3CH_2CHF_2$), dimethyl ether ($CH_3OCH_3$), or mixtures thereof.

In an embodiment of the invention, the present inventive azeotropic compositions are effective cleaning agents, defluxers and degreasers. In particular, the present inventive azeotropic compositions are useful when de-fluxing circuit boards with components such as Flip chip, µBGA (ball grid array), and Chip scale or other advanced high-density packaging components. Flip chips, µBGA, and Chip scale are terms that describe high density packaging components used in the semi-conductor industry and are well understood by those working in the field.

In another embodiment the present invention relates to a process for removing residue from a surface or substrate, comprising: contacting the surface or substrate with a composition of the present invention and recovering the surface or substrate from the composition.

In a process embodiment of the invention, the surface or substrate may be an integrated circuit device, in which case, the residue comprises rosin flux or oil. The integrated circuit device may be a circuit board with various types of components, such as Flip chips, µBGAs, or Chip scale packaging components. The surface or substrate may additionally be a metal surface such as stainless steel. The rosin flux may be any type commonly used in the soldering of integrated circuit devices, including but not limited to RMA (rosin mildly activated), RA (rosin activated), WS (water soluble), and OA (organic acid). Oil residues include but are not limited to mineral oils, motor oils, and silicone oils.

In the inventive process, the means for contacting the surface or substrate is not critical and may be accomplished by immersion of the device in a bath containing the composition, spraying the device with the composition or wiping the device with a substrate that has been wet with the composition. Alternatively, the composition may also be used in a vapor degreasing or defluxing apparatus designed for such residue removal. Such vapor degreasing or defluxing equipment is available from various suppliers such as Forward Technology (a subsidiary of the Crest Group, Trenton, N.J.), Trek Industries (Azusa, Calif.), and Ultronix, Inc. (Hatfield, Pa.) among others.

An effective composition for removing residue from a surface would be one that had a Kauri-Butanol value (Kb) of at least about 10, preferably about 40, and even more preferably about 100. The Kauri-Butanol value (Kb) for a given composition reflects the ability of said composition to solubilize various organic residues (e.g., machine and conventional refrigeration lubricants). The Kb value may be determined by ASTM D-1133-94.

The following specific examples are meant to merely illustrate the invention, and are not meant to be limiting in any way whatsoever.

EXAMPLES

Example 1

Synthesis of 1,1,1.4,4,5,5,6,6,7,7,7-dodecafluorohept-2-ene (F14E)

Synthesis of $C_4F_9CH_2CHICF_3$

Perfluoro-n-butyliodide (180.1 gm, 0.52 moles) and 3,3,3-trifluoropropene (25.0 gm, 0.26 moles) were added to a 400 ml Hastelloy™ shaker tube and heated to 200° C. for 8 hours under autogenous pressure which increased to a maximum of 428 PSI. After cooling the reaction vessel to room temperature, the product was collected. The product of this reaction and two others carried out in substantially the same manner, except that one of the reactions had twice the quantity of reactants, were combined and distilled to give 322.4 gm of $C_4F_9CH_2CHICF_3$ (52.2° C./35 mm, 70% yield).

Conversion of $C_4F_9CH_2CHICF_3$ to F14E

A 2 liter round bottom flask equipped with a stirring bar and packed distillation column and still head was charged with isopropyl alcohol (95 ml), KOH (303.7 gm, 0.54 moles) and water (303 ml). $C_4F_9CH_2CHICF_3$ (322.4 gm, 0.73 mole) was added dropwise via addition funnel to the aqueous KOH/IPA mixture at room temperature. The reaction was then heated to 65-70° C. to recover the product by distillation, The distillated was collected, washed with sodium metabisulfite and water, dried over $MgSO_4$ and then distilled through a 6-inch (15.2 cm) column packed with glass helices. The product, F14E (173.4 gm, 76% yield), boils at 78.2° C. It was characterized by NMR spectroscopy ($^{19}$F: δ −66.7 (CF$_3$, m, 3F), −81.7 (CF$_3$, m, 3F), −124.8 (CF$_2$, m, 2F), −126.4 (CF$_2$, m, 2F), −114.9 ppm (CF$_2$, m, 2F); $^1$H: 6.58d)

Example 2

Synthesis of 1,1,1,2,2,5,5,6,6,7,7,8,8,8-tetradecafluorooct-3-ene (F24E)

Synthesis of C$_4$F$_9$CHICH$_2$C$_2$F$_5$

Perfluoroethyliodide (220 gm, 0.895 mole) and 3,3,4,4,5,5,6,6,6-nonafluorohex-1-ene (123 gm, 0.50 mole) were added to a 400 ml Hastelloy™ shaker tube and heated to 200° C. for 10 hours under autogenous pressure. The product from this and two others carried out under substantially similar conditions were combined and washed with two 200 mL portions of 10 wt % aqueous sodium bisulfite. The organic phase was dried over calcium chloride and then distilled to give 277.4 gm of C$_4$F$_9$CH$_2$CHICF$_3$ (79-81° C./67-68 mm Hg) in 37% yield.

Conversion of C$_4$F$_9$CHICH$_2$C$_2$F$_5$ to F24E

A 1 L round bottom flask equipped with a mechanical stirrer, addition funnel, condenser, and thermocouple was charged with C$_4$F$_9$CHICH$_2$C$_2$F$_5$ (277.4 gm, 0.56 moles) and isopropanol (217.8 9). The addition funnel was charged with a solution of potassium hydroxide (74.5 g, 1.13 moles) dissolved in 83.8 g of water. The KOH solution was added dropwise to the flask with rapid stirring over the course of about one hour as the temperature slowly increased from 21° C. to 42° C. The reaction mass was diluted with water and the product recovered by phase separation. The product was washed with 50 mL portions of 10 wt % aqueous sodium bisulfite and water, dried over calcium chloride, and then distilled at atmospheric pressure. The product, F24E (128.7 gm, 63%) boils at 95.5° C. and was characterized by NMR ($^{19}$F: δ −81.6 (CF$_3$, m, 3F), −85.4 (CF$_3$, m 3F), −114.7 (CF$_2$, m, 2F), −118.1 (CF$_2$, m, 2F), −124.8 ppm (CF$_2$, m, 2F), −126.3 ppm (CF$_2$, m, 2F); $^1$H: δ6.48; chloroform-d solution).

Example 3

Synthesis of 1,1,1,4,5,5,5-Heptafluoro-4-(trifluoromethyl)-pent-2-ene (F13iE)

Synthesis of CF$_3$CHICH$_2$CF(CF$_3$)$_2$ (CF$_3$)$_2$CFI (265 gm, 0.9 moles) and 3,3,3-trifluoropropene (44.0 gm, 0.45 moles) were added to a 400 ml Hastelloy™ shaker tube and heated to 200° C. for 8 hours under autogenous pressure which increased to a maximum of 585 psi. The product was collected at room temperature to give 110 gm of (CF$_3$)$_2$CFCH$_2$CHICF$_3$ (76-77° C./200 mm) in 62% yield.

Conversion of (CF$_3$)$_2$CFCH$_2$CHICF$_3$ to F13iE

A 500 ml round bottom flask equipped with a stirring bar and connected to a short path distillation column and dry ice trap was charged with isopropyl alcohol (50 ml), KOH (109 gm, 1.96 moles) and water (109 ml). The mixture was heated to 42° C. and (CF$_3$)$_2$CFCH$_2$CHICF$_3$ (109 gm, 0.28 moles) was added dropwise via an addition funnel. During the addition, the temperature increased from 42 to 55° C. After refluxing for 30 minutes, the temperature in the flask increased to 62° C. and the product was collected by distillation. The product was collected, washed with water, dried with MgSO$_4$, and distilled. The product, F13iE (41 gm, 55% yield), boils at 48-50° C. and was characterized by NMR (19F: δ −187.6 (CF, m 1F), −77.1 (CF3, m 6F), −66.3 (CF3, m 3F); chloroform-d solution).

Example 4

Synthesis of C4F9CHICH2C2F5

3,3,4,4,5,5,6,6,6-Nonafluorohex-1-ene (20.5 gm, 0.0833 mole), bis(triphenyl phosphine)nickel(0) dicarbonyl (0.53 g, 0.0008 mole), and perfluoroethyliodide (153.6 gm, 0.625 mole) were added to a 210 ml Hastelloy™ shaker tube and heated at 100° C. for 8 hours under autogenous pressure. Analysis of the product by GC-MS indicated the presence of C4F9CHICH2C2F5 (64.3 GC area %) and the diadduct (3.3 GC area %); the conversion of 3,3,4,4,5,5,6,6,6-nonafluorohex-1-ene was 80.1%.

Example 5

De-Fluxing

The compositions of the present invention are effective for cleaning ionic contamination (flux residue) from a surface. The test used to determine surface cleanliness involved the following steps:

1. A rosin flux was painted liberally onto a FR-4 test board (an epoxy printed wiring board with tracing made of tinned copper).
2. The board so treated was then heated in an oven at about 175° C. for about 1-2 minutes to activate the rosin flux.
3. The board was then immersed in solder (Sn63, a 63/37 Sn/lead solder) at about 200° C. for about 10 seconds.
4. The board was then cleaned by immersion in the boiling cleaning composition for about 3 minutes and providing gentle movement of the board. The board was then immersed in a fresh, room temperature bath of cleaning composition to rinse for about 2 minutes.
5. The board was then tested for residual ionics with an Omega Meter 600 SMD ionic analyzer.

The cleaning performance was determined by weighing the board prior to deposition of the flux, after the deposition of the flux and then after the cleaning procedure. The results are given in Table 7.

TABLE 7

| Composition (wt %) | Dry weight (grams) | Wet weight (grams) | Post dry weight (grams) | % soil removed |
|---|---|---|---|---|
| PEIK/t-DCE/MeOH (71.5/26.4/2.1) | 5.4951 | 5.5689 | 5.5010 | 92% |
| | 5.0578 | 5.1401 | 5.0613 | 96% |
| | 5.4815 | 5.5554 | 5.4846 | 96% |
| | 3.3450 | 5.4124 | 5.3483 | 95% |
| | | Average | | 95% |

Example 6

Metal Cleaning

Stainless steel (type 316) 2"×3" coupons that have been grit blasted to provide an unpolished surface were pre-cleaned and oven dried to remove any residual soil. The tare weight of each coupon was determined to 0.1 mg. A small amount of mineral oil was applied with a swab, the coupon was then re-weighed to obtain the "loaded" weight. The coupon was then cleaned by immersion into a boiling cleaning composition for 1 minute, held in vapor for 30 seconds and then air dried for 1 minute. The coupon was then re-weighed and the percent of soil removed calculated using the 3 recorded weights. The results are shown in Table 8.

TABLE 8

| Composition (wt %) | Dry weight (grams) | Wet weight (grams) | Post Dry weight (grams) | Percent Soil removed |
|---|---|---|---|---|
| PEIK/t-DCE (72.9/27.1) | 21.588 | 21.6238 | 21.5881 | 100 |
| | 21.5882 | 21.62.17 | 21.5877 | 101 |
| | 21.2181 | 21.3160 | 21.2180 | 100 |
| | | Average | | 100 |

The results show efficient removal of mineral oil residue from stainless steel surfaces by the compositions of the present invention.

Example 7

Metal Cleaning

Stainless steel (type 316) 2"×3" coupons that have been grit blasted to provide an unpolished surface were pre-cleaned and oven dried to remove any residual soil. The tare weight of each coupon was determined to 0.1 mg. A small amount of DC 200 Silicone was applied with a swab, the coupon was then re-weighed to obtain the "loaded" weight. The coupon was then cleaned by immersion into a boiling cleaning composition for 1 minute, held in vapor for 30 seconds and then air dried for 1 minute. The coupon was then weighed and the percent of soil removed is calculated using the 3 recorded weights. The results are shown in Table 9.

TABLE 9

| Composition (wt %) | Dry weight (grams) | Wet weight (grams) | Post Dry weight (grams) | Percent Soil removed |
|---|---|---|---|---|
| PEIK/t-DCE (72.9/27.1) | 21.2183 | 21.26343 | 21.2183 | 100 |
| | 19.0196 | 19.0461 | 19.0198 | 99 |
| | 21.3960 | 21.4480 | 21.3963 | 99 |
| | | Average | | 100 |

The results show efficient removal of silicone residue from stainless steel surfaces by the compositions of the present invention.

Example 8

Metal Cleaning Efficacy

Stainless steel (type 316) 2"×3" coupons that have been grit blasted to provide an unpolished surface were pre-cleaned and oven dried to remove any residual soil. Each coupon was weighed to 4 places to obtain a tare weight. A small amount of mineral oil was applied with a swab, the coupon is then weighed to obtain the "loaded" weight. The coupon was then cleaned by immersion into a boiling cleaning composition for 1 minute, held in vapor for 30 seconds and then air dried for 1 minute. The coupon was then weighed and the percent of soil removed is calculated using the 3 recorded weights. The results are shown in Table 10.

TABLE 10

| Composition (wt %) | Dry weight (grams) | Wet weight (grams) | Post Dry weight (grams) | Percent Soil removed |
|---|---|---|---|---|
| PEIK/MeOH (97.0/3.0) | 21.2968 | 21.3525 | 21.3029 | 89 |
| | 21.2470 | 21.62678 | 21.2530 | 71 |
| | 21.5313 | 21.5656 | 21.5417 | 70 |
| | | Average | | 77 |

The results show efficient removal of mineral oil residue from stainless steel surfaces by the compositions of the present invention.

Example 9

Metal Cleaning Efficacy

Stainless steel (type 316) 2"×3" coupons that have been grit blasted to provide an unpolished surface were pre-cleaned and oven dried to remove any residual soil. Each coupon was weighed to 4 places to obtain a tare weight. A small amount of DC 200 Silicone was applied with a swab, the coupon is then weighed to obtain the "loaded" weight. The coupon was then cleaned by immersion into a boiling cleaning composition for 1 minute, held in vapor for 30 seconds and then air dried for 1 minute. The coupon was then weighed and the percent of soil removed is calculated using the 3 recorded weights. The results are shown in Table 11.

TABLE 11

| Composition (wt %) | Dry weight (grams) | Wet weight (grams) | Post Dry weight (grams) | Percent Soil removed |
|---|---|---|---|---|
| PEIK/MeOH (97.0/3.0) | 20.9536 | 20.9902 | 20.9536 | 100 |
| | 21.1531 | 21.1889 | 21.1528 | 101 |
| | 20.6276 | 20.6735 | 20.6285 | 98 |
| | | Average | | 100 |

Example 10

Metal Cleaning Efficacy

Stainless steel (type 316) 2"×3" coupons that have been grit blasted to provide an unpolished surface were pre-cleaned and oven dried to remove any residual soil. Each coupon was weighed to 4 places to obtain a tare weight. A small amount of mineral oil was applied with a swab, the coupon is then weighed to obtain the "loaded" weight. The coupon was then cleaned by immersion into a boiling cleaning composition for 1 minute, held in vapor for 30 seconds and then air dried for 1 minute. The coupon was then weighed and the percent of soil removed is calculated using the 3 recorded weights. The results are shown in Table 12.

TABLE 12

| Composition (wt %) | Dry weight (grams) | Wet weight (grams) | Post Dry weight (grams) | Percent Soil removed |
|---|---|---|---|---|
| F24E/t-DCE (24.2/75.8) | 21.6977 | 21.7396 | 21.6972 | 101 |
| | 19.0213 | 19.0848 | 19.0207 | 101 |
| | 21.2883 | 21.3127 | 21.2874 | 104 |

TABLE 12-continued

| Composition (wt %) | Dry weight (grams) | Wet weight (grams) | Post Dry weight (grams) | Percent Soil removed |
|---|---|---|---|---|
| | 21.5190 | 21.5599 | 21.5183 | 102 |
| | 21.5046 | 21.5438 | 21.5036 | 103 |
| | | Average | | 102 |

Example 11

Metal Cleaning Efficacy

Stainless steel (type 316) 2"×3" coupons that have been grit blasted to provide an unpolished surface were pre-cleaned and oven dried to remove any residual soil. Each coupon was weighed to 4 places to obtain a tare weight. A small amount of DC 200 Silicone oil was applied with a swab, the coupon is then weighed to obtain the "loaded" weight. The coupon was then cleaned by immersion into a boiling cleaning composition for 1 minute, held in vapor for 30 seconds and then air dried for 1 minute. The coupon was then weighed and the percent of soil removed is calculated using the 3 recorded weights. The results are shown in Table 13.

TABLE 13

| Composition (wt %) | Dry weight (grams) | Wet weight (grams) | Post Dry weight (grams) | Percent Soil removed |
|---|---|---|---|---|
| F24E/t-DCE | 21.6973 | 21.817 | 21.7333 | 70 |
| (24.2/75.8) | 19.0203 | 19.1243 | 19.0263 | 94 |
| | 21.5040 | 21.5912 | 21.5193 | 82 |
| | 21.5183 | 21.5977 | 21.5230 | 94 |
| | 21.2873 | 21.3495 | 21.2909 | 94 |
| | | Average | | 87 |

The results show efficient removal of silicone residue from stainless steel surfaces by the compositions of the present invention.

Example 12

A mixture of 21.8% F24E and 78.2% 1,2-trans-dichloroethylene (t-DCE) by weight was prepared and placed into a 5-plate distillation apparatus, with a 10:1 reflux ratio. The temperature at the distillation head was recorded and several cuts of the distilled material were removed over time. Distilled material was analyzed by gas chromatography. Data is shown in table 14 below. Composition and temperature remained stable throughout the experiment, indicating azeotropic behavior of this mixture.

TABLE 14

| Distillation cut | Head temp (C.) | Wt % distilled | % F24E | % t-DCE |
|---|---|---|---|---|
| 1 | 45 | 8 | 24.5 | 75.6 |
| 2 | 45 | 15 | 24.3 | 75.7 |
| 3 | 45 | 22 | 24.2 | 75.8 |
| 4 | 45 | 28 | 24.2 | 75.8 |

Example 13

A mixture of 20.0% F24E, 75.8% 1,2-trans-dichloroethylene (t-DCE) and 4.2% ethanol by weight was prepared and placed into a 5-plate distillation apparatus, with a 10:1 reflux ratio. The temperature at the distillation head was recorded and several cuts of the distilled material were removed over time. Distilled material was analyzed by gas chromatography. Data is shown in table 15 below. Composition and temperature remained stable throughout the experiment, indicating azeotropic behavior of this mixture.

TABLE 15

| Distillation cut | Head temp (C.) | Wt % distilled | % F24E | % t-DCE | % EtOH |
|---|---|---|---|---|---|
| 1 | 43 | 13 | 24.8 | 71.0 | 4.3 |
| 2 | 43 | 19 | 25.3 | 70.4 | 4.3 |
| 3 | 43 | 25 | 24.8 | 70.8 | 4.3 |
| 4 | 43 | 32 | 24.8 | 70.9 | 4.3 |
| 5 | 43 | 40 | 24.9 | 70.8 | 4.3 |
| 6 | 43 | 47 | 24.8 | 70.9 | 4.3 |

What is claimed is:

1. An azeotrope-like composition consisting essentially of about 1 to about 63 weight percent F24E and about 99 to about 37 weight percent trans-1, 2-dichloroethylene.

2. An azeotropic composition comprising 24.5 weight percent F24E and 75.5 weight percent trans-1, 2-dichloroethylene having a vapor pressure of about 14.7 psia (101 kPa) at a temperature of about 45° C.

3. A composition consisting essentially of the azeotrope-like composition of claim 1 and an aerosol propellant.

4. The composition of claim 3, wherein the aerosol propellant is selected from the group consisting of air, nitrogen, carbon dioxide, difluoromethane, trifluoromethane, difluoroethane, trifluoroethane, tetrafluoroethane, pentafluoroethane, heptafluoropropane, and pentafluoropropane.

5. A composition comprising the azeotropic composition of claim 2 and an aerosol propellant.

6. The composition of claim 5, wherein the aerosol propellant is selected from the group consisting of air, nitrogen, carbon dioxide, difluoromethane, trifluoromethane, difluoroethane, trifluoroethane, tetrafluoroethane, pentafluoroethane, heptafluoropropane, and pentafluoropropane.

7. A process for cleaning, comprising:
   a. contacting a surface comprising a residue with the composition of claim 1 and
   b. recovering the surface from the composition.

8. The process of claim 7 wherein said residue comprises a rosin flux.

9. The process of claim 7 wherein said residue comprises an oil.

10. The process of claim 7 wherein said surface is an integrated circuit device.

11. A process for cleaning, comprising:
   a. contacting a surface comprising a residue with the composition of claim 2 and
   b. recovering the surface from the composition.

12. The process of claim 11 wherein said residue comprises a rosin flux.

13. The process of claim 11 wherein said residue comprises an oil.

14. The process of claim 11 wherein said surface is an integrated circuit device.

* * * * *